(12) United States Patent
Thillainayagam et al.

(10) Patent No.: US 11,736,643 B2
(45) Date of Patent: Aug. 22, 2023

(54) METHODS AND SYSTEMS FOR MANAGING MULTIPLE SCAN REQUESTS BASED ON DOCUMENT PRESENCE, USER INTERFACE ACTIVITY, AND USER INFORMATION

(71) Applicant: XEROX CORPORATION, Norwalk, CT (US)

(72) Inventors: Shankaranarayanan Thillainayagam, Chennai (IN); Sudhakar Navamani, Chennai (IN); Surendranath Narayanan Arunachalam, Chennai (IN); Umapathy Bomman, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/577,557

(22) Filed: Jan. 18, 2022

(65) Prior Publication Data
US 2023/0231961 A1 Jul. 20, 2023

(51) Int. Cl.
*H04N 1/00* (2006.01)

(52) U.S. Cl.
CPC ..... *H04N 1/00875* (2013.01); *H04N 1/00018* (2013.01); *H04N 1/00037* (2013.01); *H04N 1/0048* (2013.01); *H04N 1/00076* (2013.01); *H04N 1/00079* (2013.01); *H04N 1/00082* (2013.01); *H04N 1/00777* (2013.01); *H04N 1/00854* (2013.01)

(58) Field of Classification Search
None
See application file for complete search history.

(56) References Cited

U.S. PATENT DOCUMENTS

| | | | | |
|---|---|---|---|---|
| 5,969,826 | A | * 10/1999 | Dash | H04N 1/00432 345/905 |
| 8,265,509 | B2 | * 9/2012 | Sekiya | G06F 21/34 399/80 |
| 8,824,024 | B2 | * 9/2014 | Kuno | H04N 1/00702 358/475 |
| 8,976,429 | B2 | * 3/2015 | Kani | H04N 1/2166 358/474 |
| 9,122,874 | B2 | 9/2015 | Howard et al. | |
| 9,876,925 | B2 | * 1/2018 | Mizude | H04N 1/00708 |
| 9,906,674 | B2 | * 2/2018 | Nishii | G06F 3/1222 |
| 10,951,780 | B2 | * 3/2021 | Yamauchi | H04N 1/00721 |
| 2009/0293134 | A1 | * 11/2009 | Oomura | H04N 1/4413 726/28 |
| 2015/0092220 | A1 | * 4/2015 | Matsunaga | G06K 15/4095 358/1.14 |

FOREIGN PATENT DOCUMENTS

WO WO-2018224108 A1 12/2018

\* cited by examiner

*Primary Examiner* — Scott A Rogers

(57) ABSTRACT

The present disclosure discloses methods and systems for managing multiple scan requests received at a multi-function device. The method includes receiving a scan request from a remote computing device of a remote user. Before executing the scan request, two conditions are checked. It is checked if document is present on a scanning platform of the multi-function device and further it is checked if one or more activities on a user interface of the multi-function device, are being performed. Based on the presence of the document on the scanning platform and the one or more activities on the user interface, the scan request received from the remote user is disallowed. This way, multiple scanned requests are managed at the multi-function device.

24 Claims, 12 Drawing Sheets

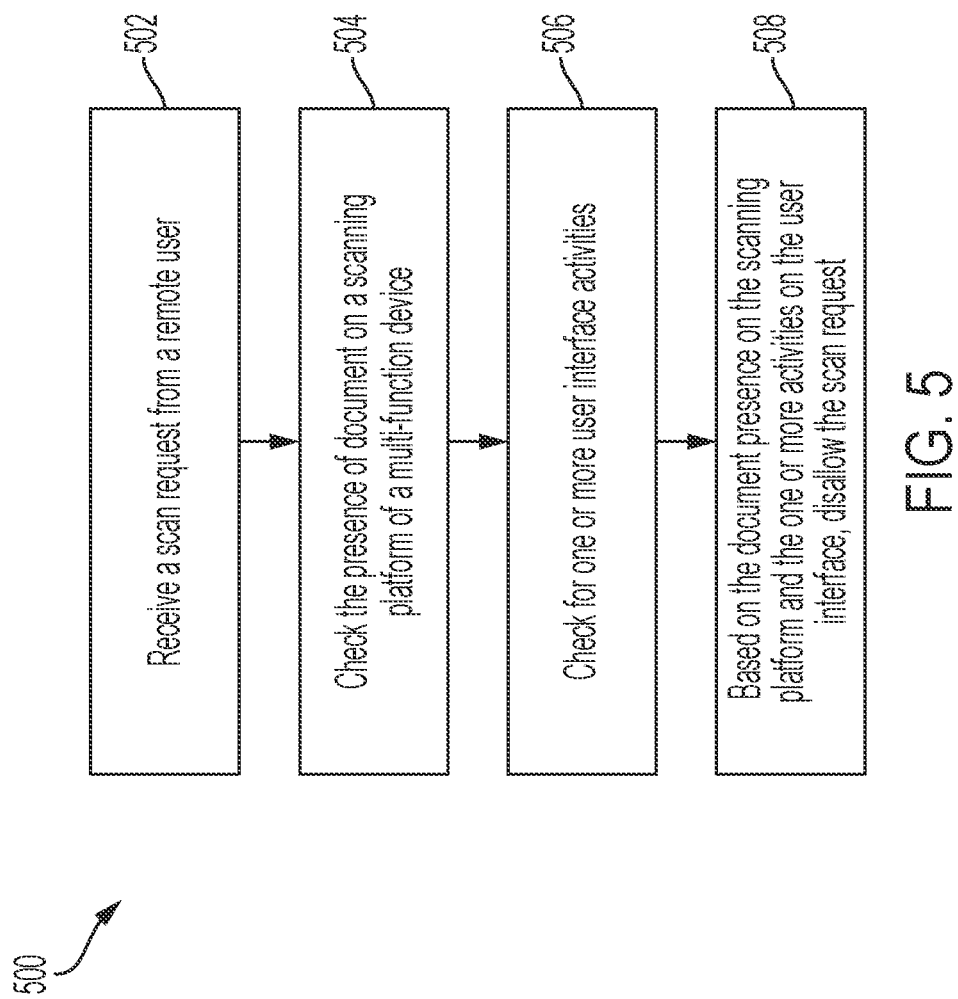

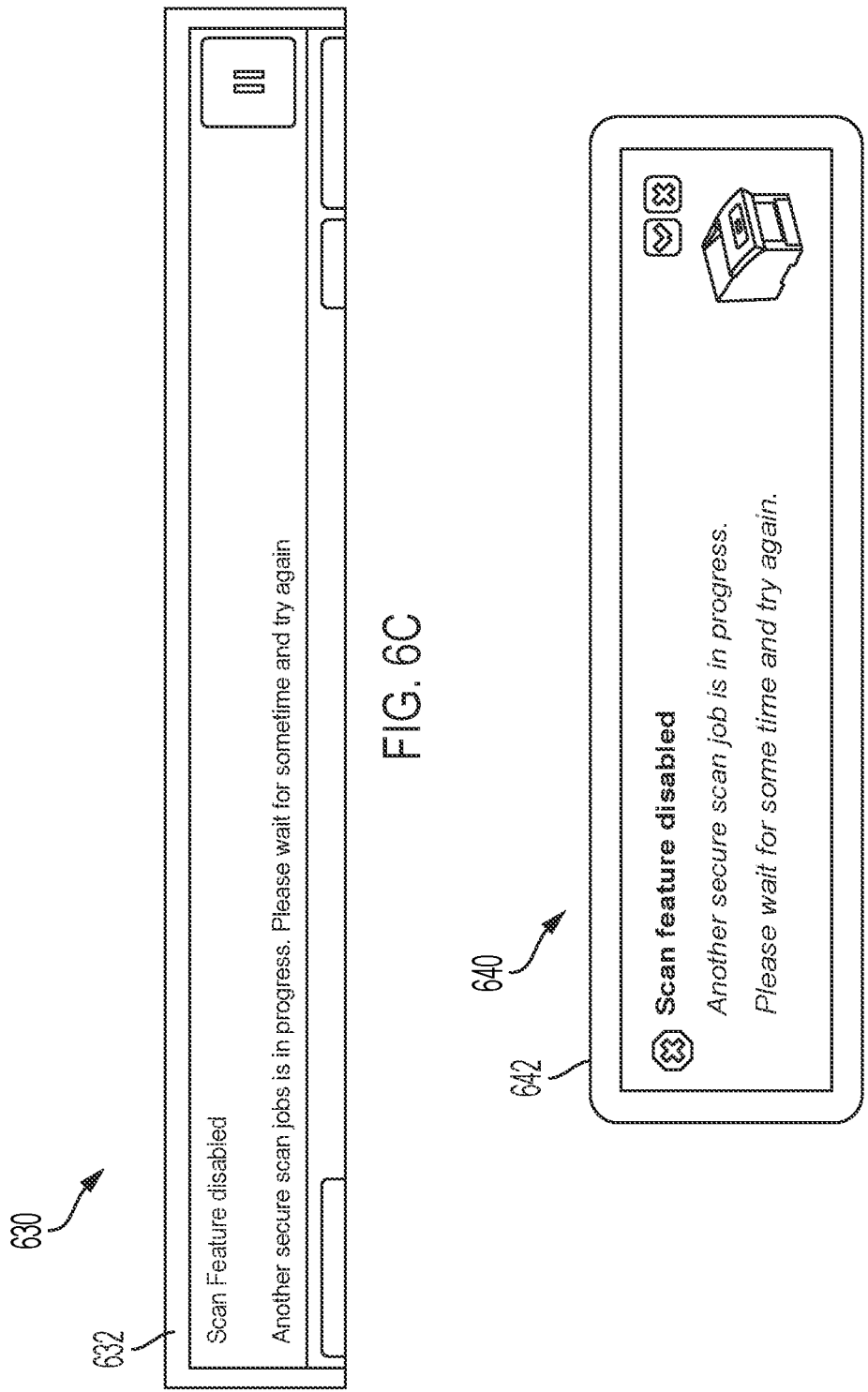

METHODS AND SYSTEMS FOR MANAGING MULTIPLE SCAN REQUESTS BASED ON DOCUMENT PRESENCE, USER INTERFACE ACTIVITY, AND USER INFORMATION

TECHNICAL FIELD

The present disclosure relates to the field of scanning. More specifically, the disclosure relates to methods and systems for managing multiple scan requests received at a multi-function device.

BACKGROUND

Multi-function devices allow its users to scan documents either directly at the multi-function device or from a remote location. For instance, a user may submit his document for scanning at the multi-function device and can initiate a scan request via a local user interface of the multi-function device. Alternatively, another user may submit a scan request from a remote location/device. For example, the user may use a scan application (i.e., scan driver) installed on his computing device for scanning. The multi-function devices work on a first come first serve basis such that if two users want to scan their documents at the same time, then the user who submits scan command/request at the multi-function device can scan his document before the other user and receives the scanned document. For example, a first user who is physically present at the multi-function device and is about to initiate a scan request may not be able to scan his documents if a remote user submits the scan request first. In such cases, although the documents submitted at the multi-function device belong to the first user, but the remote user receives the scanned document as he was first to submit the scan request.

Consider a scenario, where a user wishes to scan a confidential document at the multi-function device and an unknown user may trigger a scan request using a scan driver installed on his personal device, for example, laptop. In this scenario, the user who initiates scanning from remote location may not have a purpose to scan any document but may have an intention to know what the other user is scanning at the multi-function device. For example, a user standing at the multi-function device submits his confidential documents by placing the documents at the multi-function device, the remote user may trigger scan request from his laptop with an intention to receive the confidential documents of the other user. This parallel processing leads to loss of confidentiality of documents and may also lead to user dissatisfaction.

In view of the above, there is a need for improvised systems and methods to manage multiple scan requests in real-time.

SUMMARY

According to aspects illustrated herein, a method for managing multiple scan requests received at a multi-function device is disclosed. The method includes receiving a scan request from a remote computing device of a remote user. Before executing the scan request, following conditions are checked. The presence of a document on a scanning platform of the multi-function device is checked. Then, one or more activities performed on a user interface of the multi-function device are checked. Based on the presence of the document on the scanning platform and the one or more activities on the user interface, the scan request received from the remote user is disallowed.

According to further aspects illustrated herein, a system for managing multiple scan requests received at a multi-function device is disclosed. The system includes a remote computing device including a scan driver running on the computing device, where the scan driver sends a scan request to a multi-function device. The multi-function device is communicatively coupled to the remote computing device and receives the scan request from the remote scan driver. Before executing the scan request, the multi-function device checks for the presence of a document on a scanning platform of the multi-function device and further checks for one or more activities on a user interface of the multi-function device. Based on the presence of the document on the scanning platform and the one or more activities on the user interface, the scan request as received from the remote computing device is disallowed.

According to furthermore aspects illustrated herein, a multi-function device for managing local and remote scan requests as received at a multi-function device is disclosed. The multi-function device includes a scanning platform for receiving a document. The multi-function device further includes a controller for receiving a scan request from a remote computing device/scan driver, Before executing the remote scan request, the controller detects for an ongoing scan activity at the multi-function device. The controller checks for the ongoing scan activity by checking the presence of a document on a scanning platform of the multi-function device and by further checking for one or more activities on a user interface of the multi-function device. Based on the presence of the document on the scanning platform and the one or more activities on the user interface, the controller disallows the scan request as received from the remote computing device.

According to additional aspects illustrated here, a method for managing multiple scan requests received at a multi-function device is disclosed. The method includes receiving a document from a user on a scanning platform at the multi-function device. Once the document is received, a user interface including a pre-defined message for the user's input on secure scanning, is displayed. Then, a user interface for inputting user details is displayed. Thereafter, a scan request only from the user corresponding to the user details is allowed.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 5 is an exemplary method flowchart for managing multiple scan requests received at a multi-function device, in accordance with an embodiment of the present disclosure.

FIGS. 6A-6D show various snapshots for implementing the current disclosure.

DESCRIPTION

Figure 1:
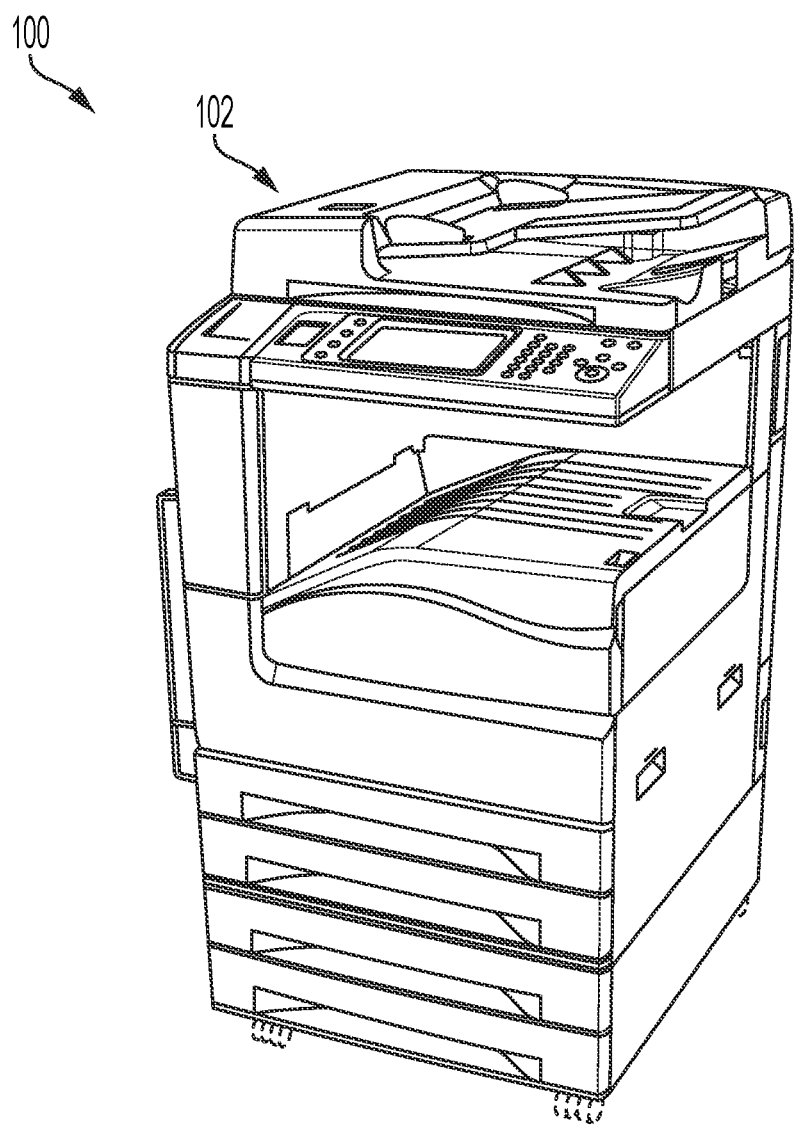
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, or the like. The multi-function device may include software, hardware, firmware, or a combination thereof. In the context of the current disclosure, the multi-function device manages multiple scan requests in real-time that are received at the multi-function device. The multiple scan requests include a scan request from a local user (also referred to as a local scan request) and a scan request from a remote user (can be referred to as a remote scan request). The multi-function device manages multiple scan requests such that scanned output generated after scanning is sent to the right/intended user/recipient and the other user cannot steal any information intentionally or unintentionally. For example, if the local user submits a document for scanning and before taking further action, the remote user triggers a scan command/request at the same time using his computing device, then the multi-function device detects the scan request and ensures the scanned document is sent to the local user. This is ensured based on one or more check conditions, discussed below in detail.

The term "document" refers to a document having one or more pages that further includes content in the form of text, image, graphics, or a combination thereof. The document is submitted for scanning at the multi-function device. The document may include confidential information or otherwise may be confidential for the user who submits the document and/or for an organization. The document may be submitted either by the local user or the remote user. The document submitted is in the physical form, such as printed on paper.

The term "user" or "local user" refers to a user who submits his document/scan command/request for scanning directly at the multi-function device and the user is further present at/near the multi-function device.

The term "remote user" refers to a user who is located remotely from the multi-function device and submits his scan request through a remotely located device such as a computing device.

The term "one or more activities" include any activity performed at the multi-function device. The one or more activities relate to scanning activity at the multi-function device. Some examples of the activities may include selecting a scan workflow, selecting one or more scan parameters such as scan resolution, output color, single side/duplex scanning, etc., inputting an email address, selecting one or more destinations, submitting/providing a scan command. These are few examples of the activities but there can be other activities performed at the multi-function device. The one or more activities are performed by the local user or an admin user.

The term "multiple scan requests" refer to include more than one scan request received at the multi-function device. The multiple scan requests are received from different users in different ways. For example, one user can simply submit a scan request directly via a local user interface (LUI) of the multi-function device. While another user can submit the scan request via a remote computing device, specifically, via a scan driver running on the remote computing device. But other multiple scan requests can be implemented.

The term "local scan request" refers to a request submitted by the local user directly via/at a user interface of the multi-function device. The term "remote scan request" refers to a request submitted by the user located remotely from the multi-function device. The request can be submitted using a computing device.

The term "scan driver" refers to an application installed on the computing device that allows the remote user to submit scan request for scanning his document. The scan driver further allows the remote user to submit one or more scan parameters such as scan resolution, output color, orientation, etc., through the computing device. The scan driver can also be referred to as a scan application.

The term "computing device" refers to a device typically used for day-to-day work such as sending emails, receiving emails, viewing emails and other purposes. Examples of the computing device include, but are not limited to, a personal computer, a desktop, a laptop, a mobile phone, a tablet, a Personal Digital Assistant (PDA), a smart-phone or any other device capable of sending and receiving data. In context of the current disclosure, the computing device includes a scan driver application for submitting scan request and other scan details as required for implementing the current disclosure. The computing device is further used by the remote user, Here, the computing device is located remotely from the multi-function device.

Overview

The present disclosure discloses methods and systems for managing multiple scan requests received at a multi-function device. In one example, the multiple scan requests include a local scan request and a remote scan request. When multiple scan requests are received, the multi-function device checks two or more conditions. Based on the check, the multi-function device allows or disallows scan request received from a remote user/computing device. This way, the multiple scan requests are managed. The multiple scan requests are managed such that a document upon scanning is sent to the right/intended user. Therefore, the present disclosure provides a secure and reliable approach of scanning documents by dismissing the scan request from the remote user while the local use scanning his documents or initiating scan operation.

Exemplary Environment

FIG. 1 shows an exemplary environment 100 in which various embodiments of the present disclosure can be practiced. The environment 100 includes a multi-function device 102, Various examples of the multi-function device 102 may be a printer, a scanner, a copier, a multi-function peripheral device, a multi-function printer, or the like. The multi-function device 102 provides one or more functionalities such as printing, scanning, imaging, copying, and so on.

In context of the present disclosure, the multi-function device 102 manages multiple scan requests in real-time, received at the multi-function device 102, In particular, the multi-function device 102 manages a local scan request and a remote scan request that are received at the multi-function device 102. The multi-function device 102 prioritizes one scan request over another based on two or more conditions which will be discussed below in detail.

In operation, a local user who is standing near/at the multi-function device 102 wishes to scan a document having one or more pages. The user submits the document at the multi-function device 102 for scanning. The document includes content in the form of text, image, graphics, or a combination thereof. The document may include confidential content such as personal details, work details, project details, client details or the like. The document may otherwise be confidential for the local user and/or for an organization, After the document is submitted at the multi-function device 102 and before scan request/command is initiated by the local user, another user such as a remote user submits a scan request/scan command through his computing device (although not shown). The remote user submits the scan request via a scan driver installed on his computing device such as laptop, desktop, mobile phone, etc. Before executing the scan request from the remote user, the multi-function device 102 checks for an ongoing local scan activity at the multi-function device 102, If there is an ongoing local scan activity already initiated at the multi-function device 102 or scan operation is under progress at the multi-function device 102, the multi-function device 102 disallows or rejects the scan request from the remote user. The local scan activity is checked based on two or more conditions. For example, the two conditions include—if the document is present at the multi-function device 102 for scanning and if one or more user activities are performed at the multi-function device 102. If both conditions are true, the multi-function device 102 disallows or rejects the scan request from the remote user or the remote computing device.

Otherwise, the multi-function device 102 allows or accepts the scan request from the remote user and sends the scanned output to the remote user. This way, the multi-function device 102 ensures that the scanned output is sent to the right/intended user. The multi-function device 102 further avoids any confusion caused due to multiple scan requests from different users and ensures confidentiality of the document submitted for scanning is maintained.

Exemplary System

AG. 2 is a block diagram of a system 200 in accordance with embodiments of the present disclosure. The system 200 includes a multi-function device 202 and a computing device 214 communicatively coupled to the multi-function device 202 via a network (although not shown but discussed below). As shown, the multi-function device 202 includes a receiver 204, a scanner 206, a user interface 208, a controller 210, and a memory 212. The computing device 214 includes a scan driver 216, and a user interface 218, Additionally, the computing device 214 includes a memory although not shown. The components 204-212 are connected to each other via a conventional bus or a later developed protocols and communicate with each other for performing various functions of the present disclosure. Similarly, the components 216-218 are connected to each other via a conventional bus or a later developed protocols and communicate with each other for performing various functions of the present disclosure. The system 200 may further include additional component(s) as required for implementing the present disclosure.

The implementation begins when a user submits a document for scanning at the multi-function device 202. The user can be a local user. The local user places the document on the receiver 204. The receiver 204 can be a platen or can be an automatic document handler (ADH) that receives the document and automatically feeds the document to the scanner 206 when scanning is initiated. Those skilled in the art will appreciate that other types of receivers 204 can be used without departing from the scope of the present disclosure.

After submitting the document, the local user submits one or more scan parameters as discussed above. While the local user is submitting or about to submit a scan request via scan button or scan command at the multi-function device 202, another user such as a remote user sends a scan request to the multi-function device 202. Here the remote user submits the scan request before the local user at the multi-function device 202. The remote user submits the scan request via his computing device 214. In particular, the remote user accesses the scan driver 216 installed on the computing device 214 for sending the scan request to the multi-function device 202. The multi-function device 202 receives the scan request, specifically, the controller 210 receives the scan request from the remote user/remote computing device 214.

Upon receiving the remote scan request from the remote user, the controller 210 checks for an ongoing local scan activity by the local user before executing the remote scan request from the remote user. In particular, the controller 210 checks if another scan operation is in progress and if the remote scan request is to be allowed or disallowed. To this end, the controller 210 checks for two or more conditions. The controller 210 checks for the presence of the document on the receiver 204 for scanning. If the controller 210 detects the presence of the document on the receiver 204 such as platen/ADH, the controller 210 proceeds forward. The controller 210 further checks for one or more activities being performed on the user interface 208 of the multi-function device 202.

The controller 210 here checks if any user activity is being performed by the local user. Various examples of the one or more activities may be, but not limited to, providing scan command by the local user, choosing, or selecting one or more scan parameters such as scan resolution, color, etc., inputting email addresses of one or more recipients, destinations such as USB drive, cloud location, etc., accessing scan workflow, and so on. These are few examples of the activities but other examples of activities by the local user can be considered for implementing the current disclosure.

Here, the presence of the document on the receiver 204 and the execution of the one or more activities on the user interface 208 indicate that a local scan activity is being performed at the multi-function device 202, If both the conditions are true, it indicates that the local user is performing a scan operation at the multi-function device 202 or has initiated a scan operation by placing the document or by inputting scan parameters or the like. Based on the check, the controller 210 rejects the scan request received from the remote user and further allows the local user to execute the scan related operations without any interruption or interference by the remote user's request. The controller 210 disallows the remote scan request sent by the remote user/remote computing device 214.

In such cases when the remote scan request is rejected by the controller 210, the controller 210 notifies the remote user about an ongoing local scan activity being performed by the local user at the multi-function device 202. The notification includes a pre-defined message indicating about the local scan request/activity already initiated at the multi-function device 202 and about the rejection. The notification can be sent via email, message, or via the scan driver 216 application running on the computing device 214. In some examples, the notification can be displayed at the computing device 214 of the remote user such as via the scan driver 216. In some examples, the notification can be sent and displayed on other devices such as mobile device, or the like. In further examples, the notification can be displayed to the remote user via the user interface 218 of the computing device 214 or any other device that is set to receive notifications from the multi-function device 202. After rejection, the remote computing device 214/user can resend the scan request after some time, for example, 5 minutes, 10 minutes, and so on. Specifically, the scan driver 216 can resend the scan request to the multi-function device 202 after some time. If the controller 210 receives the scan request again from the remote computing device 214 for scanning while the local scan activity is under progress at the multi-function device 202, the controller 210 continues to reject the remote scan request from the remote computing device 214 till the local scan activity is completed.

The controller 210 then communicates the scanner 206 to scan the document placed on the receiver 204. The scanner 206 scans the document according to the scan parameters as submitted by the local user and outputs a scanned document. The scanned document/output can be in any desired format as known or later developed formats. Finally, the scanner 206 sends the scanned output to the controller 210. The controller 210 then sends the scanned output to the local user. The controller 210 here sends the scanned output to the desired destination of the local user such as email, USB, cloud location, server location, network location, memory 212 or the like.

After successful completion of the local scan activity at the multi-function device 202, the controller 210 sends another notification to the remote user. The notification can be sent via email, message, or via the scan driver 216 application running on the computing device 214. The notification may update the remote user about the completion of the local scan activity at the multi-function device 202 and requests the remote user to submit his scan request again. The remote user can then submit the scan request at the multi-function device 202. This way, the system 200 ensures the scanned output is sent to the right user and no other user can access other's scanned output.

Referring to the above discussion, when the controller 210 identifies that one of the conditions fail, the controller 210 allows the remote scan request of the remote user. For example, no document present on the receiver 204 but the execution of the user activities at the multi-function device 202 indicates that no local scan activity is being performed at the multi-function device 202 by the local user. In other example, the presence of the document on the receiver 204 and no user activities on the user interface 208 at the multi-function device 202 again indicates that no local scan activity is being performed at the multi-function device 202.

If either of the two conditions fail i.e., either the document is not found/present on the receiver 204 or the one or more user interface activities are not being performed at the multi-function device 202, the controller 210 allows/accepts the remote scan request from the remote user. In this case, the controller 210 sends scanned document to the remote user to his desired destination. The controller 210 sends the scanned document via email, text, cloud location, server location, network location or the like. This way, the controller 210 manages multiple scan requests such that the scanned document is sent to the right recipient. And this way, the multi-function device 202 ensures that confidentiality of the scanned document is maintained.

The controller 210 communicates with other components of the multi-function device 202 such as the receiver 204, the scanner 206, and the user interface 208 to manage multiple scan request as received at the multi-function device 202. For example, the controller 210 communicates with the receiver 204 to detect the presence of document on the receiver 204. In another example, the controller 210 communicates with the user interface 208 to check for the user activities on the user interface 208, Here the controller 210 checks for any inputs received at the multi-function device 202.

This way, the system 200 manages multiple scan requests by allowing or disallowing remote scan request received from the remote computing device such as 214 based on the conditions as discussed above. For example, the system 200 rejects the remote scan request from the computing device 214 if a local scan request is found initiated or in progress at the multi-function device 202.

Although the system 200 is discussed for a scenario where the remote user submits a scan request when the local user is performing/initiated scan operations at the multi-function device 202. But the system 200 can be implemented for scenarios when two remote users want to perform scan operations at the same time. In such cases, the multi-function device 202/the controller 210 processes or executes the scan request that is submitted first at the multi-function device 202.

The system 200 can be implemented for further scenarios where a remote user places or submits his documents on the receiver 204 and before he submits the scan command via scan driver such as 216 installed on his computing device such 214, the local user submits a scan request first and wishes to scan before the remote user. In this case, the documents loaded in ADH by the remote user are considered for scanning. In case there are no documents in ADH, the document present in the platen gets scanned. As a result, the scanned output is sent to the remote user instead of the local user.

These are few exemplary scenarios but the system 200 can be implemented for any scenarios where multiple scan requests are received at the multi-function device 202. The multiple scan requests are managed such that scanned output is sent to the user who places the document first on the receiver 204.

The implementations of the system 200 above manage multiple scan requests based on the conditions check. But the system 200 can implement other ways to manage multiple scan requests and will be discussed here, According to this implementation, a user submits a document for scanning, specifically, the user places the document on the receiver 204 for scanning. The user can be a remote user or can be a local user. Upon receiving the document, the controller 210 displays the user interface 208 to the user with a pre-defined message for the user's input on secure scanning. The pre-defined message can be if the user wishes to perform secure scanning. If the user confirms that he wishes to perform secure scanning, the controller 210 proceeds forward. Else, the controller 210 proceeds with conventional way of scanning. If the user confirms he wishes to perform secure scanning, the controller 210 further displays the user interface 208 for inputting his user details. The user then inputs his user details. Various examples of the user details can be username, password, passcode, user ID, employee ID, user code, organization code or the like. The controller 210 then stores the received user details in the memory 212 of the multi-function device 202 for later retrieval, use and/or access. In some implementations, the controller 210 directly shows the user interface 208 for inputting user details after detecting the document on the receiver 204. The controller 210 only allows scan request from the user corresponding to the user details.

Later when a scan command/request is received/initiated at the multi-function device 202, the controller 210 performs a check before executing the scan request for the document placed on the receiver 204. The scan request can be from the remote user or from the local user. The remote user submits the scan request via a remote computing device such as 214 and the local user submits the scan request directly via the user interface 208 of the multi-function device 202. The controller 210 requests the user who initiated/submitted scan command at the multi-function device 202 to input his details. The controller 210 then matches the received user details with the user details stored in the memory 212 of the multi-function device 202. If matches, the controller 210 then allows the scan request from the user who initiated the scan request, Here, matching indicates that the user who submitted the document on the receiver 204 and the user who submitted the scan request at the multi-function device 202 are the same user. As a result, the controller 210 sends scanned output to the user after scanning. If not, the controller 210 disallows the scan request from the user who initiated the scan request. The mismatch indicates the user who placed the document on the receiver 204 and the user who submitted the scan request are different users. As a result, the controller 210 does not scan the document placed on the receiver 204 and further notifies the user who initiated the scan request. The notification may include a message that document on the receiver 204 belongs to some other user. In addition, the controller 210 may send notification to the user who placed the document on the receiver 204. The notification may include a message that some other user is trying to steal your information, please take an action.

Exemplary Snapshots

FIGS. 3A-3D are snapshots illustrating one exemplary implementation of the present disclosure.

Figure 3A:
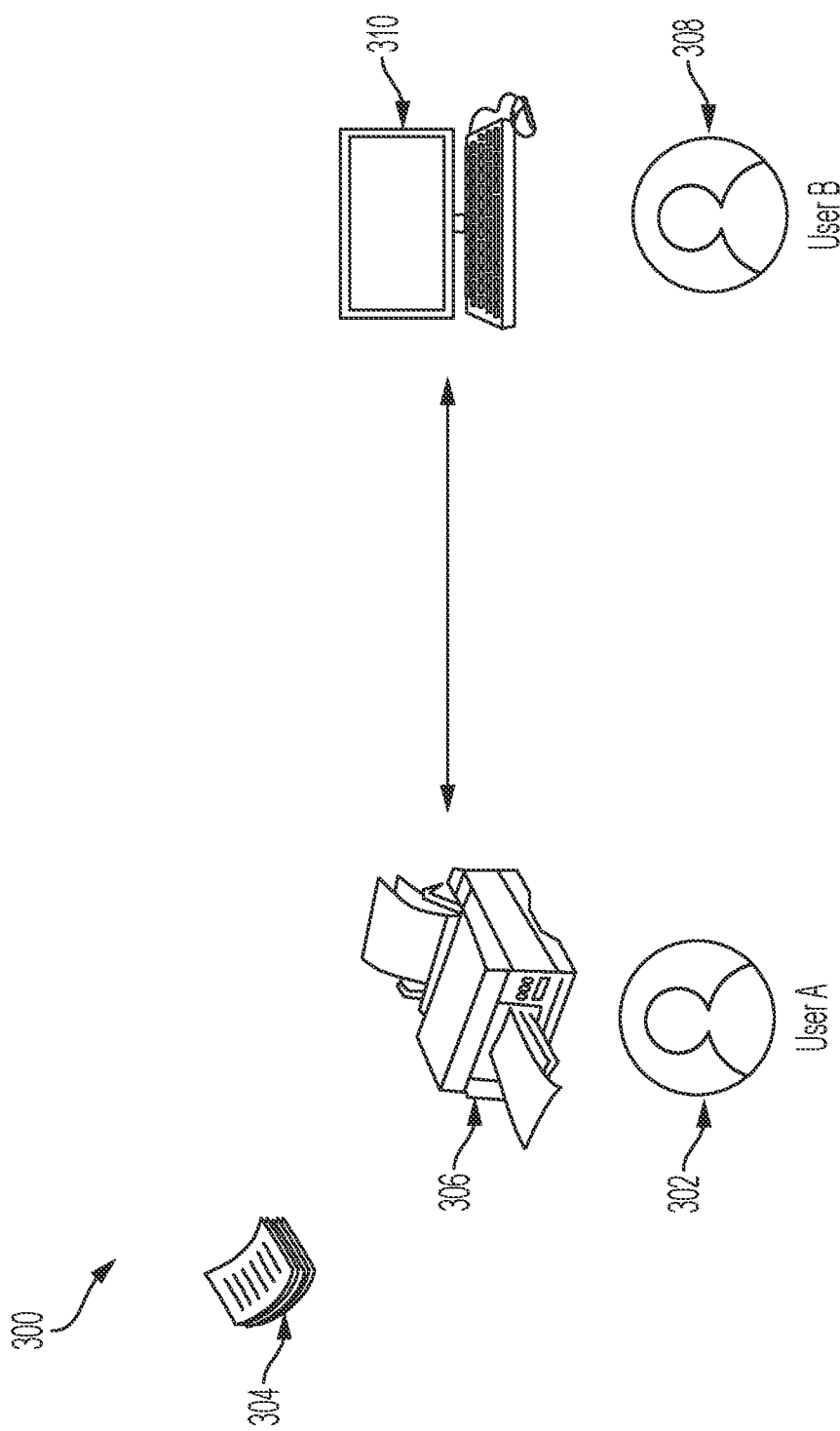
FIGS. 3A-3D are exemplary snapshots illustrating implementation of the present disclosure.

FIG. 3A shows an environment 300 including a local user (marked as 'User A' 302) and a remote user (marked as 'User B' 308), a multi-function device 306, a computing device 310 and documents 304 for scanning. The computing device 310 is communicatively coupled to the multi-function device 306 via a network. The network may be a wireless network, a wired network, or a combination thereof. The network may be implemented as one of the different types of networks, such as intranet, Local Area Network (LAN), Wide Area Network (WAN), the Internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. The network may include a variety of network devices, including routers, bridges, servers, computing devices, storage devices, and the like.

Figure 2:
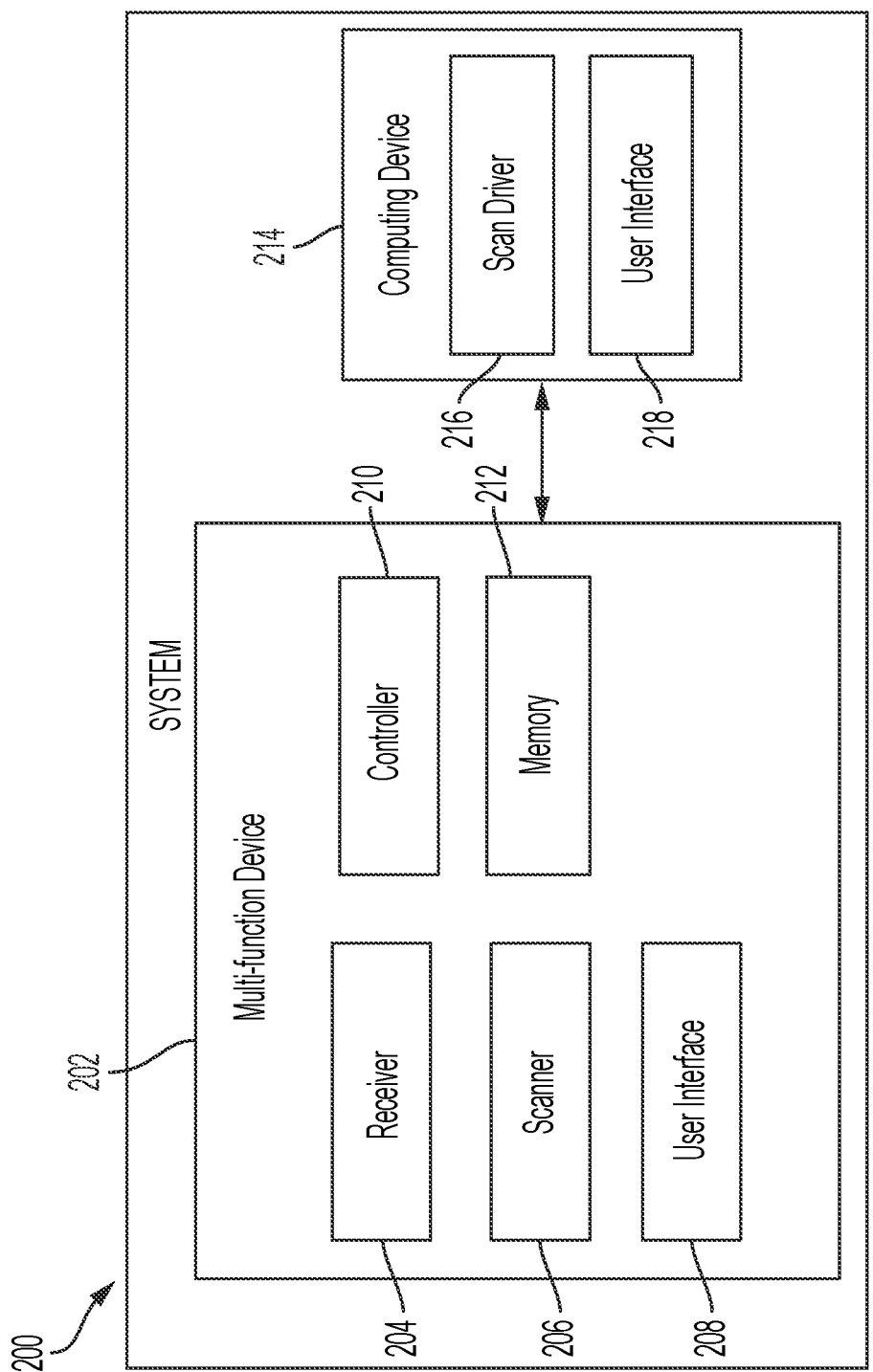
FIG. 2 is a block diagram illustrating a system and its components, in accordance with an embodiment of the present disclosure.

The documents 304 belong to the user A 302. The multi-function device 306 and the computing device 310 collectively forms a system that works in a manner like the system 200 of FIG. 2. In addition, the multi-function device 306 may have same functionalities as that of the multi-function device 102 of FIG. 1 and/or 202 of FIG. 2. According to the environment 300, the user A 302 wants to scan his documents, marked as 304 at the multi-function device 306. The computing device 310 includes an application such as a scan driver that allows the user B 308 to remotely scan his documents using the multi-function device 306.

Figure 3B:
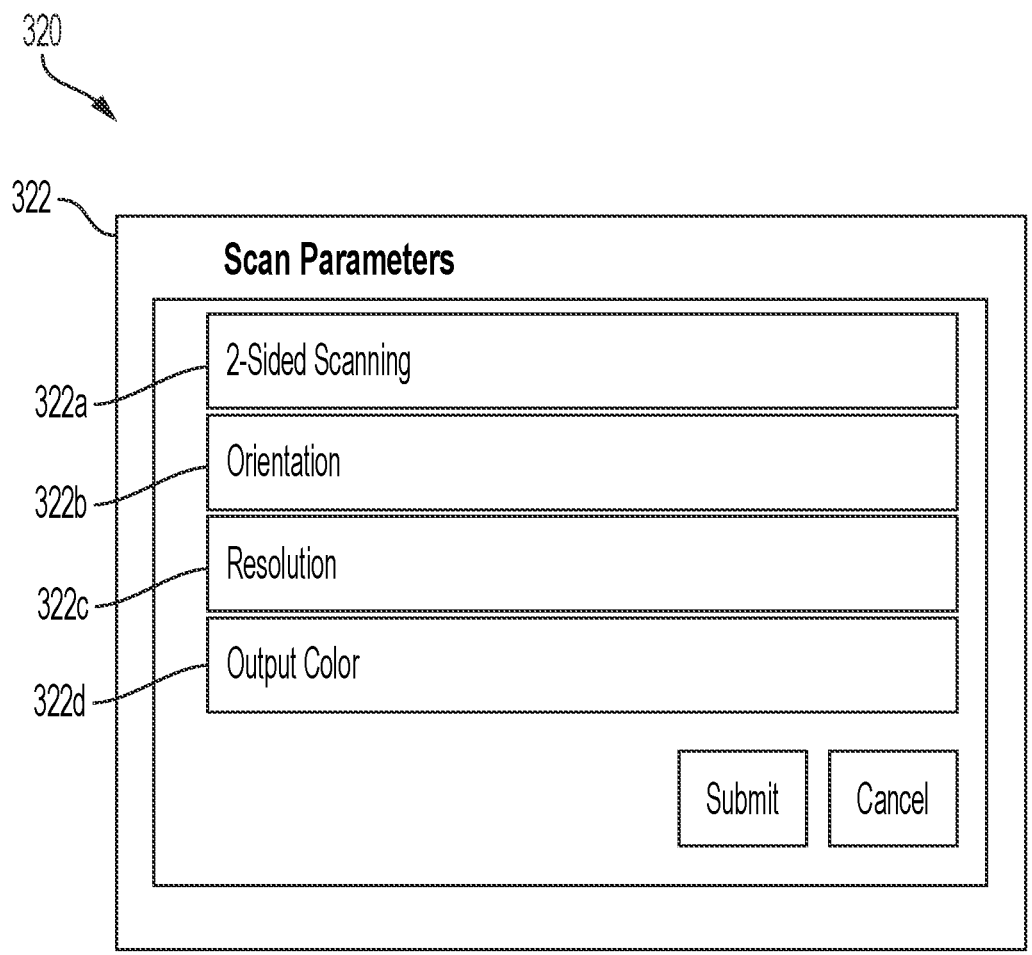

In the shown environment 300, the user A 302 submits his documents 304 for scanning at the multi-function device 306. The documents 304 include one or more pages having confidential content/information. For example, the user A 302 places the documents 304 at a scanning platform/receiver such as a platen/DADH of the multi-function device 306. Upon placing the documents, the user A 302 performs one or more activities on the user interface of the multi-function device 306 as discussed above in detail. One exemplary user interface 320 indicating user activities is shown in FIG. 3B. According to the snapshot 320, the user A 302 inputs or selects various scan parameters 322 such as 2-sided scanning 322a, orientation 322b, resolution 322c, and output color 322d. This way, the user A 302 submits his scan parameters at the multi-function device 306 and that can be considered as user activities. This is an exemplary user interface 320 showing activities being performed at the multi-function device 306 by the user A 302 but there can be other activities. For example, the user A 302 can click on a suitable option on the user interface to input the email addresses where the user A 302 wishes to send the scanned documents. Further, the user A 302 may choose between various scanning workflows such as 'scan to email', 'scan to cloud' and similar other workflows before initiating the scanning of the documents 304 at the multi-function device 306.

While the user A inputs scan parameters at the multi-function device 306, the user B 308 sends a scan request via his computing device 310. For the sake of understanding, it can be considered that user B 308 sends the request with an intention to access content of the documents 304 submitted by the user A 302 for scanning. Upon receiving the request from the remote user B 308, the multi-function device 306 checks for two or more conditions as discussed above. Based on the check of the two conditions, the multi-function device 306 accepts or rejects the remote scan request as received from the user B 308. In this case, the multi-function device 306 rejects the remote scan request as received from the user B 308. The multi-function device 306 sends a notification to the remote user B 308. One exemplary notification 340 sent to the user B 308 is shown in FIG. 3D. The notification 340 includes a message 342 "Scan Job failed: Another scan job is in progress. Please wait for some time and try again". As shown here, the notification 340 is displayed to the remote user B 308. This is just an exemplary message 342 and any suitable message can be displayed to the user B 308 on his computing device 310, Further, the user B 308 may receive notification on any other personal device that is configured to receive notifications from the multi-function device 306.

Figure 3C:
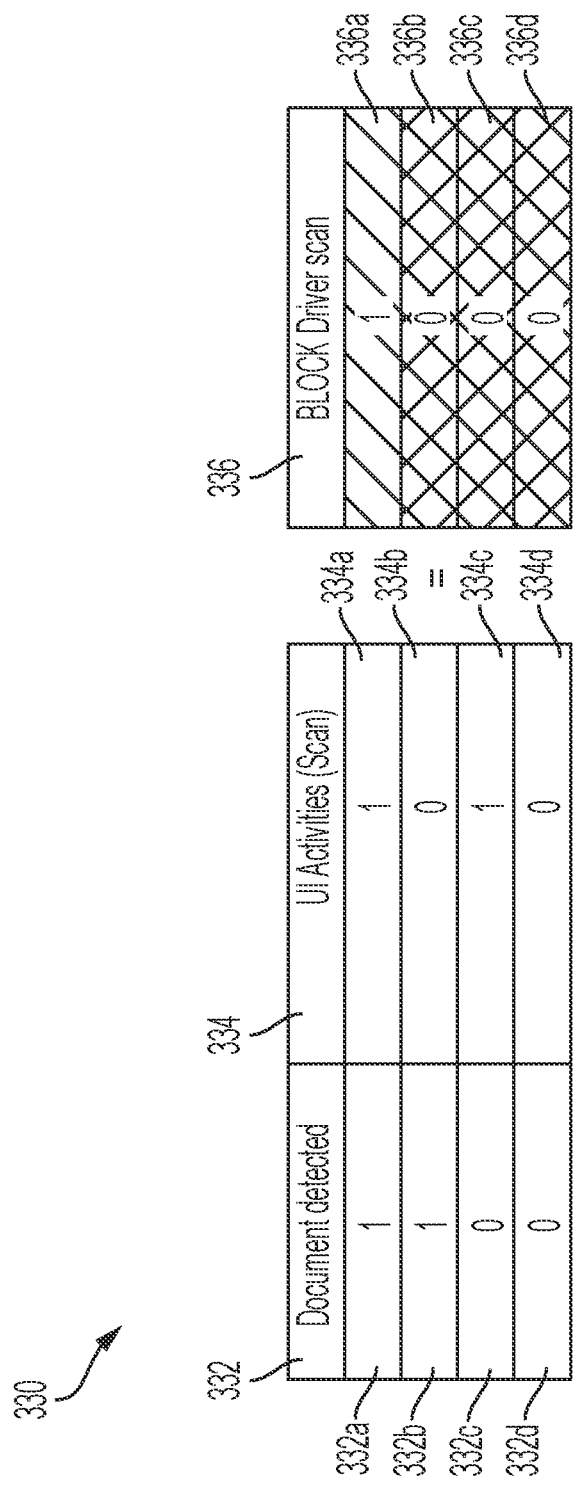
Figure 3D:
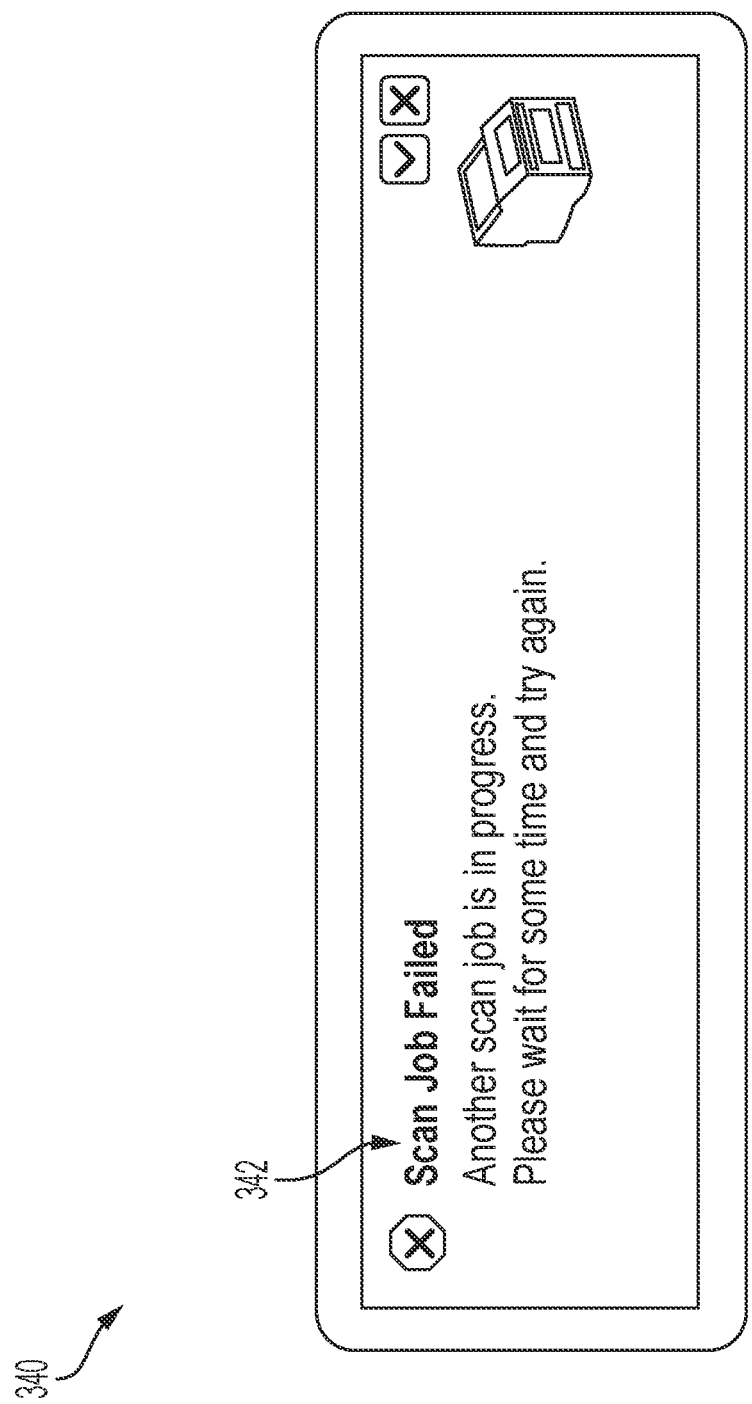

FIG. 3C depicts a table 330 including two condition checks such as 332 and 334 for managing multiple scan requests. The first condition check includes document detected 332 i.e., checking if the document is present at the multi-function device 306, The second condition includes UI activities 334 i.e., checking if any scan related user activity is being performed at the multi-function device 306. If the document is found at the multi-function device 306, then the multi-function device 306 defines the value in binary form such as "1" marked as 332*a*, and 332*b*. If the document is not found at the multi-function device 306, the mum-function device 306 defines it as "0", marked as 332*c* and 332*d*. Similarly, if the user activities are being performed at the multi-function device 306, then the multi-function device 306 considers it as yes and input "1" in the table 330, marked as 334*a* and 334*c*. But if the user activities are not being performed at the multi-function device 306, the multi-function device 306 considers it as no and indicates it as "0", marked as 334*b* and 334*d* as shown in the table 330. The multi-function device 306 adds output in the column 336 named as block driver scan—whether to block the remote scan request or not. For example, if the column 336 includes "1" such as 336*a*, then the multi-function device 306 blocks the remote scan request of the remote user B 308. If the column 336 includes "0" marked as 336*b*, 336*c* and 336*d*, then multi-function device 306 allows the remote scan request from the user B 308. This way, the mufti-function device 306 maintains the table 330 and allows or rejects the remote scan request based on the output in the column 336.

As further shown in the table 330, if the document is detected (marked as 332*a*) and the UI scan activities are also seen (marked as 334*a*) at the multi-function device 306, the remote scan request is blocked or rejected, marked as 336*a*. This indicates that a local user is already performing a scan operation and the remote user has to wait until the ongoing scan operation is completed. Here, the documents 304 are scanned and sent to the user A 302, i.e., the local user. If the document is detected (marked as 332*b*) at the multi-function device 306, but the UI scan activities are not executed at the multi-function device 306 (marked as 334*b*), then the remote scan request is not blocked (marked as 336*b*). As a result, the remote scan request is executed by the multi-function device 306. Here, the documents 304 are scanned and sent to the user B 308, i.e., the remote user. If the document is not detected (marked as 332*c*) at the multi-function device 306 but the UI activities are seen (marked as 334*c*) at the device 306, the multi-function device 306 accepts the remote scan request (marked as 336*c*) and executes it. If the document is not detected (marked as 332*d*) and UI activities are not seen (marked as 334*d*) at the multi-function device 306, the multi-function device 306 accepts the remote scan request (marked as 336*c*) and executes it. To summarize, the multi-function device 306 blocks or rejects the scan request received from the remote user only when both the check conditions are true. In all other scenarios where either or both conditions fail, the remote user is allowed to scan the documents placed on the device 306. For the sake of clarity, it can be considered that when no user interface activities are seen at the multi-function device 306 and only a document is present on the scanning platform, the document is placed by the remote user who is performing activities (such as submitting scan parameters, destination etc.) using his scan driver to submit the scan request. In another case, where the document is not present at the multi-function device 306, but one or more activities are seen at the multi-function device 306, it can be considered that a local user or an admin user is performing some other tasks at the multi-function device 306, but multi-function device 306 is available to take up the remote scan request. In further cases, absence of both the check conditions indicate that no user is using the multi-function device 306, specifically, scanner and hence the multi-function device 306 can accept remote scan request.

The memory 212 stores scanned document, user details, scan attributes, or other details relevant for implementing the current disclosure. The controller 210 or other components may retrieve the required details from the memory 212. The user interface 208 can be used for displaying information to the local user such as scan workflow, scan parameters, or notifications to the user. The user interface 208 can be used for inputting information such as user details, scan parameters, scan input, destination, or other details relevant for the current disclosure.

Exemplary Flowcharts

Figure 4:
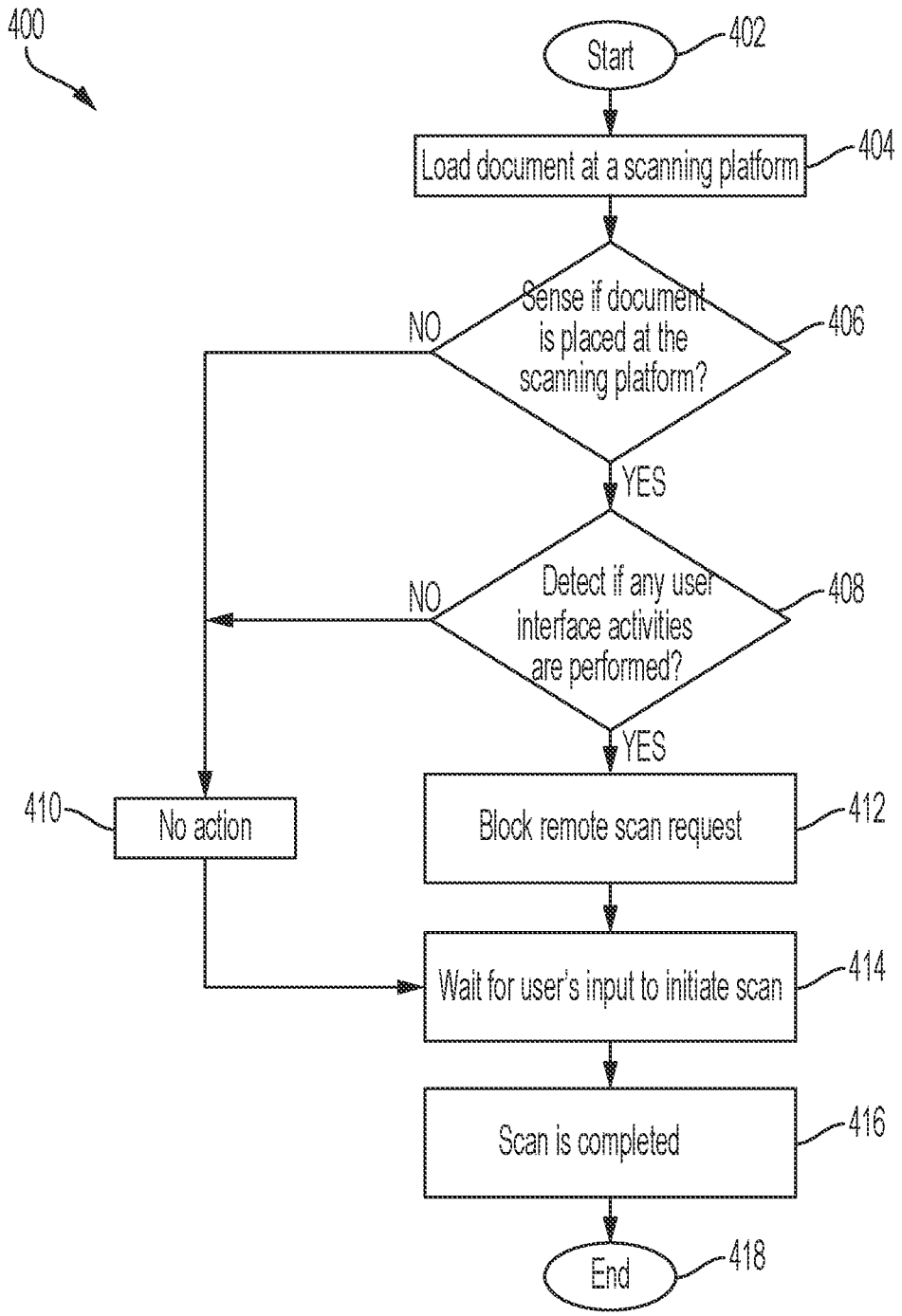
FIG. 4 is an exemplary flowchart for managing multiple scan requests at a multi-function device.

FIG. 4 is an exemplary flowchart 400 for managing multiple scan requests at a device such as a multi-function device or a scanner. For easy discussion, the method 400 is discussed wrt to the multi-function device such as 102, without limiting its scope. The method implementation starts at 402 when the multi-function device is in an operational condition. At 404, a user submits/loads a document for scanning at a scanning platform such as ADH/platen of the multi-function device. Subsequently, the loaded document placed on the scanning platform/ADH is sensed/detected at 406. In case the document is detected, the method 400 proceeds to block 408, where one or more UI activities are detected. It can be considered that blocks 406 and 408 may take place in a reverse order where the multi-function device may check the UI activities before checking the presence of document at the scanning platform/ADH. In case, both the conditions are met, a remote scan request sent by a remote user is blocked at 412. If any of the two conditions are not met, no action is taken (marked 410). In some cases, where the first check condition (at 406) fails, the implementation may directly jump to 410. In such cases, the other condition (at 408) is not checked. At 414, user's input is awaited to initiate scan operation. For instance, if the two check conditions are met at 406 and 408 and the remote user's scan request is blocked, then input from the local user is waited to initiate scan operation, for example, by pressing a scan button. Alternatively, if either of the two conditions 406 or 408 fail and the remote user is allowed to scan, then input from the remote user is awaited to initiate scan operation such as by submitting the scan request via the scan driver installed on his computing device. Subsequently, scanning is completed, and the scanned output is sent to the right/intended user, at 416. The scanned document is sent based on the user selected option. For instance, the user may select a cloud location, email address, location on network, and so on to receive the scanned document. The implementation ends at 418 once the scanned document is successfully sent to the intended user.

FIG. 5 is an exemplary method flowchart 500 for managing multiple scan requests received at a multi-function device, in accordance with an embodiment of the present disclosure. The method 500 may be implemented at a multi-function device, such as the multi-function device 102 of FIG. 1, or the multi-function device 202 of FIG. 2. But the method 500 can be implemented at any equivalent device with scan functionality.

The method 500 is implemented in a scenario where multiple scan requests are received at the multi-function device. For example, a remote user sends a scan request at the multi-function device when another user (i.e., local user) is performing scan related operations at the same multi-function device. Here the scan-related operations can include—placing documents to be scanned on a scanning platform (e.g., platen/ADH), opening of scanning workflow at the multi-function device, inputting scan parameters such as scan resolution, output color, orientation, and so on.

The method 500 begins when a remote user sends a scan request at the multi-function device. The remote user uses a scan driver that is installed on his computing device (e.g., laptop) for submitting the scan request. Subsequently, at 502, the scan request is received from the remote user at the multi-function device.

Once the scan request from the remote user is received, at 504, the presence of a document on a scanning platform of the multi-function device is checked. At this block 504, a scanning platform such as platen/ADH is checked for the presence of any documents. These documents may be placed by the local user for scanning at the multi-function device. At 506, one or more user interface activities are checked. The activities performed on the user interface of the multi-function device can be automatic activities or user-performed activities. For example, when the user places a document at the scanning platform for scanning, a scanning workflow is automatically displayed to the user via the user interface of the multi-function device. This automatic opening of the scanning workflow can be considered as an activity at the user interface. In other scenarios, the user may perform one or more activities via the user interface of the multi-function device. Such exemplary activities include inputting one or more scan parameters such as scan resolution, output color, orientation, etc. or inputting email address(es) of recipient, destination(s), submitting scan command, accessing scan workflow, and so on. It can be considered that the activity can be either performed by the user or can be automatically performed by the multi-function device. For example, in some cases, the multi-function device automatically displays/opens a copy menu as soon as a document is loaded at the scanning platform. This can be considered as the user interface activity.

Based on the presence of the document on the scanning platform and the one or more activities on the user interface, the scan request received from the remote user is disallowed or blocked at 508. For example, the presence of documents on the scanning platform and the activities on the user interface indicate that another user/local user is performing scan operations at the multi-function device, and thus the scan request sent from remote user is rejected or dismissed. This allows the local user to continue his scan activity at the multi-function device. In such cases, the scanned document is sent to the local user. In this case, the remote user receives one or more notifications on his computing device informing him about the ongoing local scan operation. The remote user may receive the notification on the computing device that is used to send the scan request. In other cases, the notification may be sent on any other computing device that is configured to receive notifications from the multi-function device.

In cases where either of the check conditions fail—that is either the document is not found on the scanning platform or activities on the user interface are not seen/performed, the scan request submitted by the remote user is executed. The remote scan request is also executed when both the check conditions fail—the presence of the document is not found on the scanning platform of the multi-function device or the execution of the one or more activities is not seen on the user interface of the multi-function device. The execution of remote scan request allows the remote user to scan his document. Also, upon successful completion of the remote scan request, the scanned document is sent to the remote user via email, for example, or other suitable options.

This way, the method 500 manages the multiple scan requests that are submitted at the multi-function device by the local user and remote user.

The method 500 includes additional blocks such as informing the remote user about completion of the ongoing local scan. This allows the remote user to submit his scan request as soon as the multi-function device is available for taking up new scan requests.

Figure 6A:
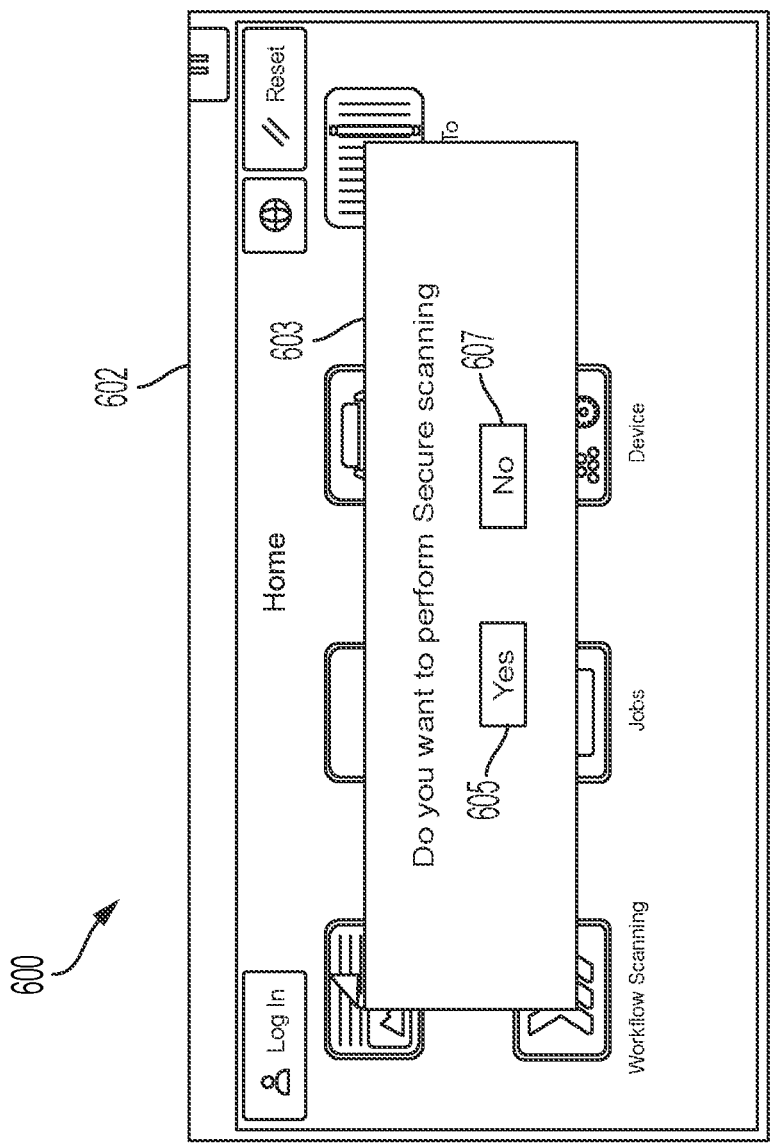
Figure 6B:
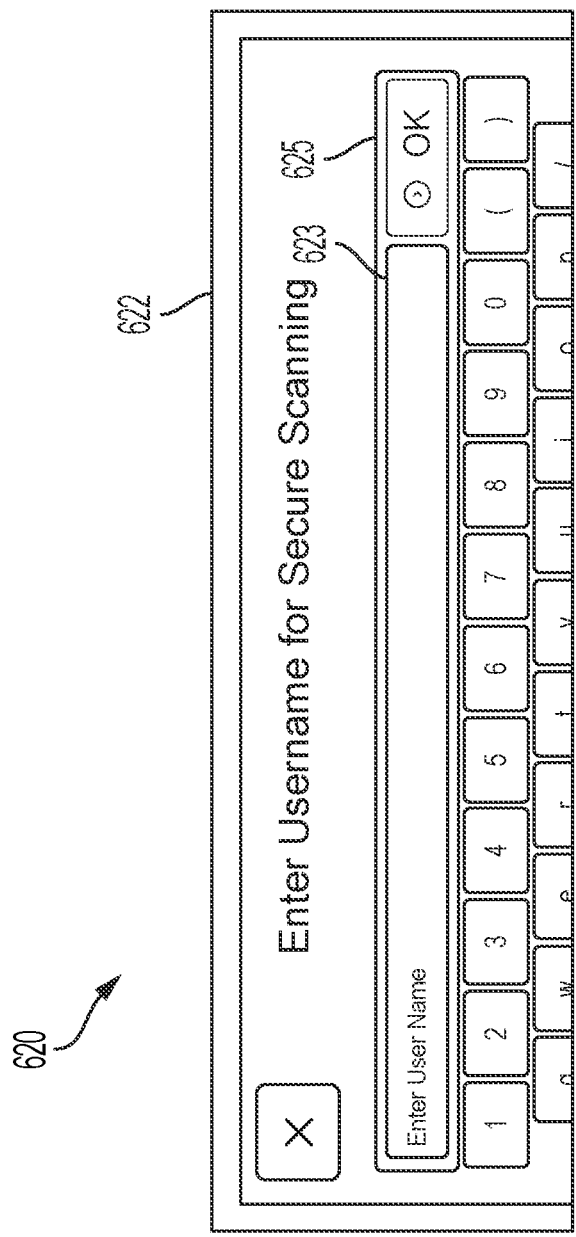
Figure 7:
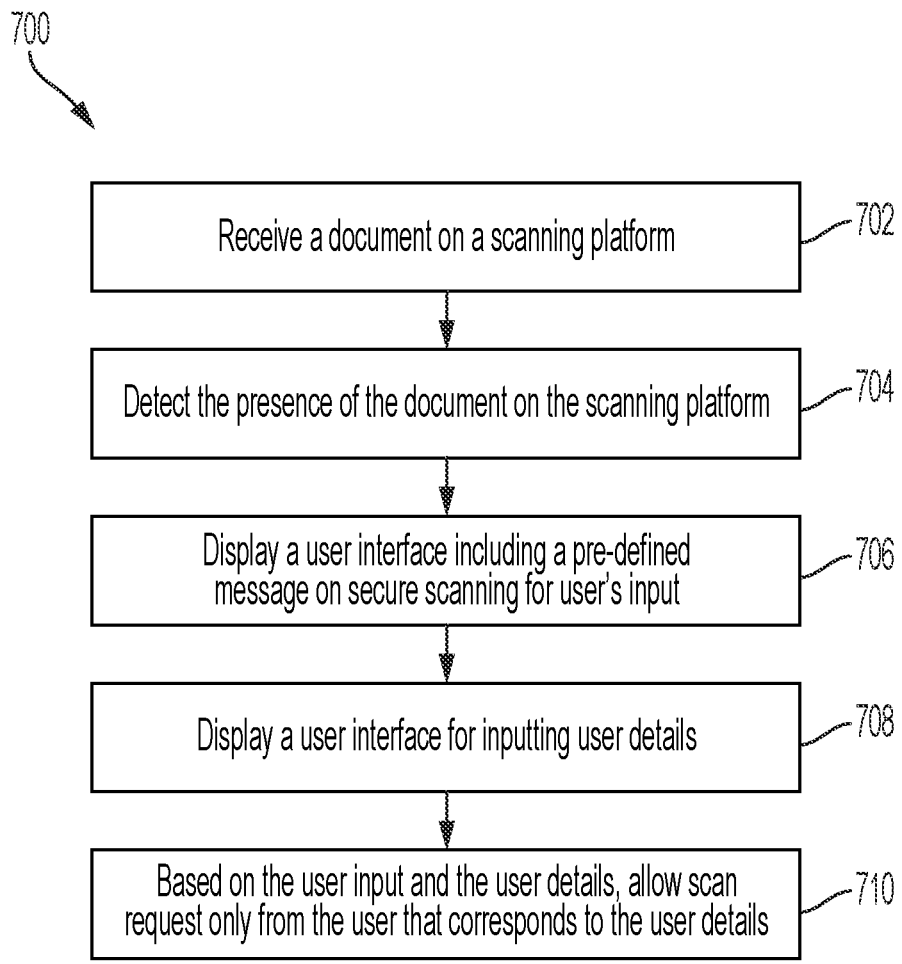
FIG. 7 is another method flowchart for managing multiple scan requests at a multi-function device.

FIG. 7 is another method flow chart 700 for managing multiple scan requests. The method 700 is implemented at a multi-function device, a scanner, or an equivalent device with scanning functionalities. At 702, a document from a user is received. The document is received on a scanning platform such as a platen or an automatic document handler (ADH) of the multi-function device. Then, presence of the document placed on the scanning platform is automatically detected at 704. Upon detecting the document on the scanning platform, a user interface including a pre-defined message for user's input is displayed at 706. The pre-defined message includes checking if the user wishes to go for secure scanning. One exemplary snapshot 600 of the user interface 602 is shown in FIG. 6A. As shown, the user interface 602 asks the user whether he wants to perform secure scanning. The user interface 602 shows a pre-defined message 603—"Do you want to perform secure scanning". Along with the message 603, options "Yes" (marked as 605) and "No" (marked as 607) are displayed to the user. If the user wishes to perform secure scanning, the user selects the option "Yes" 605. Otherwise, the user can select the option "No" 607. The selection of the options 605 or 607 can be considered as user activities on the user interface of the multi-function device.

At 708, based on the user input on the secure scanning, a user interface is further displayed to the user for inputting user details. Various examples of the user details may include such as username, user email address, user ID, employee ID, passcode, password, or other specific details of the user. One such exemplary snapshot 620 of the user interface 622 is shown in HG. 6B. As shown, the user interface 622 asks for the username. The user can provide his username in the given textbox 623 and click the option Ok, marked as 625.

Once the user input including confirmation on secure scanning and the user details are received, the method 700 proceeds further. The user details are stored in the memory of the multi-function device for later retrieval, use and/or access.

Based on the user input and the user details, a scan request only from the user corresponding to the user details is allowed at 710, For example, scan request from the user with matching user details is allowed.

Later when a scan request is received at the multi-function device, user details of the user sending/submitting the scan request are checked before executing the scan request (i.e., before scanning the document placed on the scanning platform and/or sending the scanned document). Here, the scan request can be received from a remote computing device (from a remote user) or via a local user interface of the multi-function device (local user). For example, if the user details who sent the scan request matches with the stored user details, the scan request is allowed from that user. But, if the details of the user sending the scan request do not match with the stored user details, the scan request is disallowed from that user. For example, the scan request from that user is blocked. As a result, scanning is not initiated and/or also the scanned output is not sent to this user.

In one example, if the local user submits the scan request, the local user is required to submit his user details. The local user can submit his user details at the user interface of the multi-function device. The submitted user details are matched with the stored user details. Based on successful matching, the local user is allowed to proceed with scanning. Otherwise, the scan request from the local user is disallowed. As a result, scanning does not proceed forward.

In another example, if the remote user submits the scan request, the details of the remote user are retrieved from his scan request. When the remote user sends the scan request, his credentials are automatically retrieved from the computing device or from other apps running on the computing device by the scan driver application and are sent to the multi-function device. The received user details are then matched with the stored user details. Based on successful matching, the remote user is allowed to proceed with scanning, Otherwise, the scan request from the remote user is disallowed. As a result, scanning does not proceed forward.

The method 700 ensures scanning is initiated by the right user i.e., only by the user who places the document on the scanning platform for scanning.

When the multi-function device blocks the scan and any user wants to perform scan operation in the scan WI or in the computing scan driver, one or more notifications are displayed. An exemplary snapshot 630 of notification displayed to the user via the user interface 632 of the multi-function device is shown in FIG. 6C. Another exemplary snapshot 640 of notification displayed to the user via the user interface 642 of the remote scan driver or computing device is shown in FIG. 6D.

Although the disclosure is discussed with scanning as an example, but the disclosure can be implemented for copy scenarios without deviating from the scope of the disclosure.

The present disclosure discloses methods and systems for managing multiple scan requests received at a multi-function device. The methods and systems reject the scan request received from a remote user if a local user is performing scan related operations on the multi-function device. The systems and methods detect if a document is already present on a scanning platform of the multi-function device along with checking one or more user interface activities related to scan operations. The methods and systems avoid loss of data or any confusion between the local user and the remote user for scenarios when the local user places his document for scanning, but the remote user initiates the scan request before the local user and receives the scanned output that belongs to the local user. The methods and systems avoid data loss which may happen with or without user's knowledge. The methods and systems further provide a secure way of scanning where no user receives the scanned output of another user, thereby ensuring security and confidentiality of the documents. The methods and systems further prevent the remote user having an intention to see into other user's document. The methods and systems stop parallel processing, this ensures confidentiality of documents and further adds user's satisfaction. The methods and systems provide ways to manage scan triggers from remote users. The methods and systems improve security and confidentiality at multi-function devices in a way that further engage more scan activity from users. The methods and systems prevent other users' attempt to scan the same document from their remote computing device when scan operation is initiated. The methods and systems additionally ensure that owner of the document has exclusive control of the multi-function device (and his document) until it is finished. The methods and systems ensure that the user feels confident that his document won't be accidentally or purposely redirected to another user when remotely scanning. The methods and systems address scan features in multi-function devices.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components, Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, detecting, checking, sending, displaying, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for managing multiple scan requests received at a multi-function device, the method comprising:
   receiving a scan request from a remote computing device;
   before executing the scan request, checking for following conditions:
      checking for the presence of a document on a scanning platform of the multi-function device; and
      further checking for one or more activities on a user interface of the multi-function device; and
   based on the presence of the document on the scanning platform and the one or more activities on the user interface, disallowing the scan request received from the remote computing device.

2. The method of claim 1, further comprising, disallowing the scan request from the remote computing device, when the document is present on the scanning platform of the multi-function device and the one or more activities are performed on the user interface of the multi-function device.

3. The method of claim 2, further comprising, sending a notification to a remote user about an ongoing scan activity by a local user at the multi-function device.

4. The method of claim 2, further comprising, sending a scanned document to the local user.

5. The method of claim, 1, further comprising, sending one or more notifications to a remote user.

6. The method of claim 1, further comprising, executing the scan request received from the remote computing device, when either of the conditions fails, including: the presence of the document is not found on the scanning platform of the multi-function device, or the one or more activities are not performed on the user interface of the multi-function device.

7. The method of claim 1, further comprising, executing the scan request received from the remote computing device, when both the conditions fail including: the presence of the document is not found on the scanning platform of the multi-function device and the one or more activities are not performed on the user interface of the multi-function device.

8. The method of claim 6 or 7, further comprising, allowing a remote user to scan one or more documents.

9. The method of claim 8, further comprising, sending a scanned document to the remote user.

10. The method of claim 1, wherein the presence of the document on the scanning platform and the execution of the one or more activities on the user interface indicates an ongoing local scan activity at the multi-function device and/or the document belongs to a local user.

11. A system for managing multiple scan requests received at a multi-function device, the system comprising:
   a remote computing device comprising a scan driver running on the computing device, wherein the scan driver sends a scan request to the multi-function device; and
   the multi-function device, communicatively coupled to the remote computing device, for:
      receiving the scan request from the scan driver;
      before executing the scan request, checking for following conditions:
         checking for the presence of a document on a scanning platform of the multi-function device; and
         further checking for one or more activities on a user interface of the multi-function device; and based on the presence of the document on the scanning platform and the one or more activities on the user interface, disallowing the scan request as received from the remote computing device.

12. The system of claim 11, wherein the multi-function device disallows the scan request from the remote computing device when the document is present on the scanning platform and the one or more activities are performed on the user interface of the multi-function device.

13. The system of claim 12, wherein the multi-function device sends a notification to a remote user about an ongoing scan activity by a local user at the multi-function device.

14. The system of claim 11, wherein the multi-function device executes the scan request from the remote computing device, when either of the conditions fails: the presence of the document is not found on the scanning platform of the multi-function device, or the one or more activities are not performed on the user interface of the multi-function device.

15. The system of claim 11, wherein the multi-function device executes the scan request from the remote computing device when both the conditions fail: the presence of the document is not found on the scanning platform of the multi-function device and the one or more activities are not performed on the user interface of the multi-function device.

16. A multi-function device for managing local and remote scan requests received at the multi-function device, the multi-function device comprising:
a scanning platform for receiving a document; and
a controller for receiving a scan request from a remote computing device;
before executing the remote scan request, detecting an ongoing local scan activity by:
checking the presence of the document on the scanning platform of the multi-function device; and
further checking for one or more activities on a user interface of the multi-function device; and
based on presence of the document on the scanning platform and the one or more activities on the user interface, disallowing the scan request as received from the remote computing device.

17. The multi-function device of claim 16, wherein the controller disallows the scan request from the remote computing device when the document is present on the scanning platform of the multi-function device and the one or more activities are performed on the user interface of the multi-function device.

18. The multi-function device of claim 17, wherein the controller sends a notification to a remote user for an ongoing local scan activity at the multi-function device.

19. The multi-function device of claim 16, wherein the controller executes the scan request from the remote computing device, when either of the conditions fail: the presence of the document is not found on the scanning platform of the multi-function device, or the one or more activities are not performed on the user interface of the multi-function device.

20. The multi-function device of claim 16, wherein the controller executes the scan request from the remote computing device, when both the conditions fail: the presence of the document is not found on the scanning platform of the multi-function device and the one or more activities are not performed on the user interface of the multi-function device.

21. The multi-function device of claim 16, wherein the controller executes a local scan request when both the conditions are met: the document is present on the scanning platform of the multi-function device and the one or more activities are performed on a user interface of the multi-function device.

22. A method for managing multiple scan requests received at a multi-function device, the method comprising:
receiving, by the multi-function device, a document from a user on a scanning platform of the multi-function device;
upon receiving the document, displaying, by the multi-function device, a user interface for receiving a user input on secure scanning;
based on the user input on secure scanning, displaying, by the multi-function device, a user interface for inputting user details;
storing, by the multi-function device, the input user details for later use;
before executing a scan request received at the multi-function device, checking, by the multi-function device, details of the user who sent the scan request at the multi-function device;
allowing, by the multi-function device, the scan request if the details of the user who sent the scan request matches with the stored user details.

23. The method of claim 22, further comprising, disallowing the scan request if the details of the user who sent the scan request does not match with the stored user details.

24. The method of claim 22, wherein the scan request is received from one of: a remote computing device or via a local user interface of the multi-function device.

* * * * *